(12) United States Patent
Negley et al.

(10) Patent No.: US 7,304,694 B2
(45) Date of Patent: Dec. 4, 2007

(54) SOLID COLLOIDAL DISPERSIONS FOR BACKLIGHTING OF LIQUID CRYSTAL DISPLAYS

(75) Inventors: Gerald H. Negley, Hillsborough, NC (US); Antony P. van de Ven, Sai Kung (HK); Ban Poh Loh, Durham, NC (US)

(73) Assignee: Cree, Inc., Durham, NC (US)

( * ) Notice: Subject to any disclaimer, the term of this patent is extended or adjusted under 35 U.S.C. 154(b) by 408 days.

(21) Appl. No.: 11/034,240

(22) Filed: Jan. 12, 2005

(65) Prior Publication Data

US 2006/0152651 A1   Jul. 13, 2006

(51) Int. Cl.
*G02F 1/1335* (2006.01)
(52) U.S. Cl. .............................. 349/64; 349/61; 349/69
(58) Field of Classification Search .................. 349/64, 349/65, 61, 69, 70
See application file for complete search history.

(56) References Cited

U.S. PATENT DOCUMENTS

| | | |
|---|---|---|
| 4,042,552 A | 8/1977 | Grucza |
| 4,107,238 A | 8/1978 | Roper et al. |
| 4,141,941 A | 2/1979 | Travnicek |
| 4,562,018 A | 12/1985 | Neefe |
| 4,650,922 A | 3/1987 | McPherson |
| 4,794,048 A | 12/1988 | Oboodi et al. |
| 4,826,424 A | 5/1989 | Arai et al. |
| 4,918,497 A | 4/1990 | Edmond |
| 4,935,665 A | 6/1990 | Murata |
| 4,966,862 A | 10/1990 | Edmond |
| 5,024,966 A | 6/1991 | Dietrich et al. |
| 5,027,168 A | 6/1991 | Edmond |
| 5,087,949 A | 2/1992 | Haitz |
| 5,110,278 A | 5/1992 | Tait et al. |
| 5,143,660 A | 9/1992 | Hamilton et al. |
| 5,166,815 A | 11/1992 | Elderfield |

(Continued)

FOREIGN PATENT DOCUMENTS

EP   0 439 227 A1   7/1991

(Continued)

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/US2006/002117, May 30, 2006.

(Continued)

*Primary Examiner*—Mike Qi
(74) *Attorney, Agent, or Firm*—Myers Bigel Sibley & Sajovec, P.A.

(57) ABSTRACT

A display panel for a flat panel display includes an array of LCD devices and an array of LED devices that are configured to radiate light in a light path that impinges on the array of LCD devices, to provide backlighting on the array of LCD devices. A solid colloidal dispersion of particles of a first material having a first index of refraction dispersed in a second material having a second index of refraction, such as a solid foam structure, is provided in the light path to reduce spatial non-uniformity of the backlighting.

28 Claims, 2 Drawing Sheets

U.S. PATENT DOCUMENTS

| | | |
|---|---|---|
| 5,210,051 A | 5/1993 | Carter, Jr. |
| 5,277,840 A | 1/1994 | Osaka et al. |
| 5,298,768 A | 3/1994 | Okazaki et al. |
| 5,338,944 A | 8/1994 | Edmond et al. |
| 5,374,668 A | 12/1994 | Kanemura et al. |
| 5,393,993 A | 2/1995 | Edmond et al. |
| 5,416,342 A | 5/1995 | Edmond et al. |
| 5,523,589 A | 6/1996 | Edmond et al. |
| 5,604,135 A | 2/1997 | Edmond et al. |
| 5,631,190 A | 5/1997 | Negley |
| 5,669,486 A | 9/1997 | Shima |
| 5,739,554 A | 4/1998 | Edmond et al. |
| 5,753,730 A | 5/1998 | Nagata et al. |
| 5,813,753 A | 9/1998 | Vriens et al. |
| 5,851,063 A | 12/1998 | Doughty et al. |
| 5,857,767 A | 1/1999 | Hochstein |
| 5,858,278 A | 1/1999 | Itoh et al. |
| 5,882,553 A | 3/1999 | Prophet et al. |
| 5,912,477 A | 6/1999 | Negley |
| 5,959,316 A | 9/1999 | Lowery |
| 5,968,422 A | 10/1999 | Kennedy |
| 6,060,729 A | 5/2000 | Suzuki et al. |
| 6,066,861 A | 5/2000 | Höhn et al. |
| 6,069,440 A | 5/2000 | Shimizu et al. |
| 6,120,600 A | 9/2000 | Edmond et al. |
| 6,156,242 A | 12/2000 | Saito et al. |
| 6,177,688 B1 | 1/2001 | Linthicum et al. |
| 6,184,544 B1 | 2/2001 | Toda et al. |
| 6,187,606 B1 | 2/2001 | Edmond et al. |
| 6,191,833 B1 * | 2/2001 | Hirakata ............. 349/61 |
| 6,201,262 B1 | 3/2001 | Edmond et al. |
| 6,219,223 B1 | 4/2001 | Kobayashi et al. |
| 6,252,254 B1 | 6/2001 | Soules et al. |
| 6,329,676 B1 | 12/2001 | Takayama et al. |
| 6,346,973 B1 | 2/2002 | Shibamoto et al. |
| 6,373,188 B1 | 4/2002 | Johnson et al. |
| 6,383,417 B1 | 5/2002 | Paulson et al. |
| 6,391,231 B1 | 5/2002 | Evans et al. |
| 6,404,125 B1 | 6/2002 | Garbuzov et al. |
| 6,480,389 B1 | 11/2002 | Shie et al. |
| 6,498,355 B1 | 12/2002 | Harrah et al. |
| 6,521,915 B2 | 2/2003 | Odaki et al. |
| 6,531,328 B1 | 3/2003 | Chen |
| 6,562,643 B2 | 5/2003 | Chen |
| 6,572,236 B2 * | 6/2003 | Suzuki et al. ......... 362/600 |
| 6,576,930 B2 | 6/2003 | Reeh et al. |
| 6,599,768 B1 | 7/2003 | Chen |
| 6,639,356 B2 | 10/2003 | Chin |
| 6,686,609 B1 | 2/2004 | Sung |
| 6,707,069 B2 | 3/2004 | Song et al. |
| 6,734,465 B1 | 5/2004 | Taskar et al. |
| 6,744,077 B2 | 6/2004 | Trottier |
| 6,783,362 B2 | 8/2004 | Cao |
| 6,791,151 B2 | 9/2004 | Lin et al. |
| 6,824,294 B2 | 11/2004 | Cao |
| 6,846,089 B2 * | 1/2005 | Stevenson et al. ......... 362/627 |
| 6,853,131 B2 | 2/2005 | Srivastava et al. |
| 7,068,332 B2 * | 6/2006 | Liu et al. ............. 349/64 |
| 2002/0006044 A1 | 1/2002 | Harbers et al. |
| 2002/0123164 A1 | 9/2002 | Slater, Jr. et al. |
| 2002/0172354 A1 | 11/2002 | Nishi |
| 2003/0006418 A1 | 1/2003 | Emerson et al. |
| 2003/0032212 A1 | 2/2003 | Wang et al. |
| 2003/0067264 A1 | 4/2003 | Takekuma |
| 2003/0080341 A1 | 5/2003 | Sakano et al. |
| 2003/0098459 A1 | 5/2003 | Horiuchi et al. |
| 2003/0128313 A1 | 7/2003 | Kaminsky et al. |
| 2003/0153861 A1 | 8/2003 | Royer |
| 2003/0173575 A1 | 9/2003 | Eisert et al. |
| 2004/0041222 A1 | 3/2004 | Loh |
| 2004/0041757 A1 | 3/2004 | Yang et al. |
| 2004/0056260 A1 | 3/2004 | Slater, Jr. et al. |
| 2004/0065894 A1 | 4/2004 | Hashimoto et al. |
| 2004/0066556 A1 | 4/2004 | Dontula et al. |
| 2004/0079957 A1 | 4/2004 | Andrews et al. |
| 2004/0095738 A1 | 5/2004 | Juang |
| 2004/0120155 A1 | 6/2004 | Suenaga |
| 2004/0211970 A1 | 10/2004 | Hayashimoto et al. |
| 2004/0222433 A1 | 11/2004 | Mazzochette et al. |
| 2004/0253427 A1 | 12/2004 | Yokogawa et al. |
| 2004/0264212 A1 | 12/2004 | Chung et al. |

FOREIGN PATENT DOCUMENTS

| | | |
|---|---|---|
| EP | 1 045 458 A2 | 10/2000 |
| EP | 1 059 667 A2 | 12/2000 |
| EP | 1 139 439 A1 | 10/2001 |
| GB | 2 371 629 A | 7/2002 |
| JP | 4-159519 A | 6/1992 |
| JP | 5-152609 A | 6/1993 |
| JP | 6-151974 A | 5/1994 |
| JP | 6-177429 A | 6/1994 |
| JP | 6-244458 A | 9/1994 |
| JP | 08-116095 A | 5/1996 |
| JP | 8-162676 A | 6/1996 |
| JP | 09-083018 A | 3/1997 |
| JP | 9-146089 A | 6/1997 |
| JP | 9-246603 A | 9/1997 |
| JP | 10-98215 A | 4/1998 |
| JP | 10-098215 A | 4/1998 |
| JP | 10-242513 A | 9/1998 |
| JP | 11-261114 A | 9/1999 |
| JP | 11-298047 A | 10/1999 |
| JP | 2000-101147 A | 4/2000 |
| JP | 2000-174347 A | 6/2000 |
| JP | 2000-183405 A | 6/2000 |
| JP | 2000-286455 A | 10/2000 |
| JP | 2000-286458 A | 10/2000 |
| JP | 2001-77427 A | 3/2001 |
| JP | 2001-77433 A | 3/2001 |
| JP | 2001-144334 A | 5/2001 |
| JP | 2001-230453 A | 8/2001 |
| JP | 2002-118293 A | 4/2002 |
| JP | 2002-158378 A | 5/2002 |
| JP | 2002-223004 A | 8/2002 |
| JP | 2002-280616 A | 9/2002 |
| JP | 2003-17755 A | 1/2003 |
| JP | 2003-243718 A | 8/2003 |
| JP | 2003-318448 A | 11/2003 |
| WO | WO 97/24706 A2 | 7/1997 |
| WO | WO 97/24706 A3 | 7/1997 |
| WO | WO 01/43113 A1 | 6/2001 |
| WO | WO 01/61764 A1 | 8/2001 |
| WO | WO 02/059982 A1 | 8/2002 |
| WO | WO 03/056876 A2 | 7/2003 |
| WO | WO 03/056876 A3 | 7/2003 |
| WO | WO 03/091771 A1 | 11/2003 |

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/US2005/043719, May 26, 2006.

Notification of Transmittal of the International Search Report and the Written Opinion of the International Searching Authority, or the Declaration, International Search Report, and Written Opinion of the International Searching Authority, PCT International Application No. PCT/US2006/000414, May 8, 2006.

Notification of Transmittal of the International Search Report and the Written Opinion of the International Searching Authority, or the Declaration, International Search Report, and Written Opinion of the International Searching Authority, PCT International Application No. PCT/US2005/044805, May 9, 2006.

Notification of Transmittal of the International Search Report and the Written Opinion of the International Searching Authority, or the Declaration, International Search Report, and Written Opinion of the International Searching Authority, PCT International Application No. PCT/US2005/023873, May 8, 2006.

Aavid Thermalloy, LLC, *Extrusion Profiles*, retrieved Oct. 18, 2004 from http://www.aavidthermalloy.com/products/extrusion/index.shtml.

Andrews, *Methods for Packaging A Light Emitting Devices*, U.S. Appl. No. 60/557,924, filed Mar. 31, 2004.

Andrews, *Reflector Packages and Methods for Packaging of a Semiconductor Light Emitting Devices*, U.S. Appl. No 60/558,314, filed Mar. 31, 2004.

Cabot Corporation, *Using Nanogel in Daylighting Systems*, retrieved Jan. 11, 2005 from http://w1.cabot-corp.com/Controller.jsp?. . . .

Craford, *Overview of Device Issues in High-Brightness Light-Emitting Diodes*, Chapter, *High Brightness Light Emitting Diodes: Semiconductors and Semimetals*, vol. 48, Stringfellow et al. ed., Academic Press, 1997, pp. 47-63.

Cree, Inc., *Cree Optoelectronics LED Product Line*, Publication CPR3AX, Rev. D, 2001-2002.

Heatron, *ELPOR® Product Information*, retrieved Oct. 16, 2004 from http://www.heatron.com.

Heatron, *Metal Core PCBs for LED Light Engines* (Product Brochure), retrieved from http://www.heatron.com.

International Search Report, PCT/US03/27912, Jan. 30, 2004.

IRC Advanced Film Division, *Insulated Aluminum Substrates* (Product Brochure) retrieved from http://www.irctt.com, copyright 2002.

IRC Advanced Film Division, *Thick Film Application Specific Capabilities* (Product Brochure), retrieved from http://www.irctt.com, copyright 2002.

Loh, *Power Surface Mount Light Emitting Die Package*, U.S. Appl. No. 10/446,532, May 27, 2003.

Morris, *IRC's Anotherm™ PC Boards Eliminate Heat for Automotive LED Applications*, Mar. 16, 2004 Press Release, retrieved Sep. 17, 2004 from http://www.irctt.com/pages/Anotherm_PressRelease.cfm.

Negley et al., *Light Emitting Diode Arrays for Direct Backlighting of Liquid Crystal Displays*, U.S. Appl. No. 11/022,332, filed Dec. 23, 2004.

Negley et al., *Methods of Coating Semiconductor Light Emitting Elements by Evaporating Solvent From a Suspension*, U.S. Appl. No. 10/946,587, filed Sep. 21, 2004.

Negley et al., *Solid Block Mounting Substrates for Semiconductor Light Emitting Devices and Oxidizing Methods for Fabricating Same*, U.S. Appl. No. 10/659,108, filed Sep. 9, 2003.

Negley et al., *Transmissive Optical Elements Including Transparent Plastic Shell Having a Phosphor Dispersed Therein, and Methods of Fabricating Same*, U.S. Appl. No. 10/659,240, filed Sep. 9, 2003.

Negley, *Reflective Optical Elements for Semiconductor Light Emitting Devices*, U.S. Appl. No. 10/898,608, filed Jul. 23, 2004.

Negley, *Semiconductor Light Emitting Device Mounting Substrates and Packages Including Cavities and Cover Plates, and Methods of Packaging Same*, U.S. Appl. No. 11/011,748, filed Dec. 14, 2004.

Negley, *Semiconductor Light Emitting Devices Including Patternable Films Comprising Transparent Silicone and Phosphor, and Methods of Manufacturing Same*, U.S. Appl. No. 10/947,704, filed Sep. 23, 2004.

Negley, *Solid Metal Block Semiconductor Light Emitting Devices Mounting Substrates and Packages Including Cavities and Heat Sinks, and Methods of Packaging Same*, U.S. Appl. No. 10/972,910, filed Oct. 25, 2004.

Notification of Transmittal of The International Search Report and The Written Opinion of the International Searching Authority, or the Declaration, International Search Report and Written Opinion of the International Searching Authority, PCT/US2004/017325, Sep. 28, 2004.

Slater, Jr. et al., *Phosphor-Coated Light Emitting Diodes Including Tapered Sidewalls and Fabrication Methods Therefor*, U.S. Appl. No. 60/411,980, Sep. 19, 2002.

\* cited by examiner

SOLID COLLOIDAL DISPERSIONS FOR BACKLIGHTING OF LIQUID CRYSTAL DISPLAYS

FIELD OF THE INVENTION

This invention relates to Liquid Crystal Display (LCD) devices, and more particularly, to backlighting of LCD devices.

BACKGROUND OF THE INVENTION

LCD devices are widely used in flat panel displays for monitors, televisions and/or other displays. As is well known to those having skill in the art, an LCD display generally includes a planar array of LCD devices that act as an array of optical shutters. Transmissive LCD displays employ backlighting using fluorescent cold cathode tubes above, beside and sometimes behind the array of LCD devices. A diffusion panel behind the LCD devices can be used to redirect and scatter the light evenly to provide a more uniform display.

For example, it is known to use one or more fluorescent cold cathode tubes adjacent one or more edges of the planar array of LCD devices, and a light guide or light pipe that directs the light from the fluorescent cold cathode tubes, to illuminate the face of the planar array of LCD devices. Unfortunately, such edge lighting may be inefficient, with up to 50% or more of the light being lost.

It is also known to provide an array of fluorescent cold cathode tubes behind and facing the planar array of LCD devices. Unfortunately, an array of fluorescent cold cathode tubes may increase the thickness of the LCD display and/or increase the power consumption thereof. It also may be difficult to uniformly illuminate the planar array of LCD devices with the array of fluorescent cold cathode tubes.

Semiconductor light emitting devices, such as Light Emitting Diode (LED) devices, also may be used for edge illumination of a planar array of LCD devices. For example, U.S. patent application Ser. No. 10/898,608, filed Jul. 23, 2004, entitled *Reflective Optical Elements for Semiconductor Light Emitting Devices*, to coinventor Negley, and assigned to the assignee of the present invention, the disclosure of which is hereby incorporated herein by reference in its entirety as if set forth fully herein, describes side emission LEDs that may be used for large area LCD and/or television backlighting.

Semiconductor light emitting devices, such as LED devices, also may be used for direct backlighting of LCD displays. For example, U.S. patent application Ser. No. 11/022,332, filed Dec. 23, 2004, entitled *Light Emitting Diode Arrays For Direct Backlighting Of Liquid Crystal Displays*, to coinventor Negley et al., and assigned to the assignee of the present invention, the disclosure of which is hereby incorporated herein by reference in it entirety as if set forth fully herein, describes an array of LED devices that is closely spaced apart from an array of LCD devices to provide backlighting therefor.

It is generally desirable to provide backlighting for an LCD display that appears uniform to a user of the display. Uniform backlighting may be provided by increasing the space between the LED devices or cold cathode tubes and the diffusion panel, to allow a relatively thick "mixing zone", wherein the light output from the LED devices and/or fluorescent tubes can mix uniformly. Unfortunately, if the thickness of the mixing zone is increased, the overall thickness of the flat panel display may also undesirably increase.

Backlighting uniformity also may be provided by decreasing the pitch between adjacent LED devices and/or fluorescent cold cathode tubes. Unfortunately, if the pitch is decreased, more LED devices and/or fluorescent cold cathode tubes may be used, which may undesirably increase the cost and/or power consumption of the flat panel display.

SUMMARY OF THE INVENTION

Some embodiments of the present invention provide a display panel for a flat panel display that includes a planar (i.e., a two-dimensional) array of LCD devices and a plurality of LED devices that are configured to radiate light in a light path that impinges on the planar array of LCD devices, to provide backlighting on the planar array of LCD devices. A solid foam structure is provided in the light path. As is well known to those having skill in the art, a solid foam structure is a colloidal dispersion (i.e., a mixture in which particles of a first material are dispersed throughout a second material), wherein gas particles such as air are dispersed in a solid material.

In some embodiments, the solid foam structure comprises an open cell foam block, such as an open cell polyethylene foam block. In other embodiments, the solid foam structure comprises a solid colloidal dispersion of air bubbles in an optically transparent material having an index of refraction that is different from air. In still other embodiments, the solid foam structure includes compressible and/or incompressible foam. In yet other embodiments, the solid foam structure comprises an aerogel. As is well known to those having skill in the art, an aerogel is a very low density solid foam that can typically contain about 50% to about 99.5% air by volume. The aerogel may include phosphor materials therein. In still other embodiments, the solid foam structure is thermally insulating so as to reduce the impact of heat generated by the LED devices on the LCD devices.

In other embodiments, display panels for flat panel displays include a planar array of LCD devices and a light source that is configured to radiate light in a light path that impinges on the planar array of LCD devices, to provide backlighting on the planar array of LCD devices. A solid colloidal dispersion of particles of a first material having a first index of refraction in a second material having a second index of refraction, is provided. The solid colloidal dispersion is located in the light path, and is configured to reduce spatial nonuniformity of the backlighting on the planar array of LCD devices compared to the backlighting provided in the absence of the solid colloidal dispersion in the light path.

In some embodiments, the light source can include at least one LED device and/or at least one fluorescent cold cathode tube. In other embodiments, the LED devices include a planar array of LED devices that is closely spaced apart from the planar array of LCD devices to define the light path, wherein at least some of the LED devices are disposed within a periphery of the planar array of LCD devices. In some embodiments, the first material comprises a solid and/or a gas. In some embodiments, the solid colloidal dispersion is configured to reflect, refract and/or scatter light in the light path. In some embodiments, the first and second materials are optically transparent, i.e., they allow at least some incident light to pass therethrough. Moreover, in some embodiments, the index of refraction of the first material is higher than that of the second material and, in other embodiments, the index of refraction of the second material is higher than that of the first material.

Display panels for flat panel displays according to yet other embodiments of the present invention include an LCD device screen, a diffusion panel on the LCD device screen, and a light source that is spaced apart from the diffusion panel to define a light path from the light source to the diffusion panel, and provide backlighting on the LCD device screen of a predetermined spatial nonuniformity. Optical means is provided in the light path from the light source to the diffusion panel, for reducing the spatial nonuniformity of the backlighting on the planar array of LCD devices. In some embodiments, one or more brightness-enhancing films also may be provided between the LCD device screen and the diffusion panel. In some embodiments, the diffusion panel comprises an acrylic scattering film. In some embodiments, the light source comprises at least one LED device. The optical means for reducing spatial nonuniformity can include a material in the light path that is configured to reflect, refract and/or scatter light in the light path. In some embodiments, the material can include a solid foam structure, aerogel and/or a solid colloidal dispersion, as was described above.

DETAILED DESCRIPTION

Figure 2:
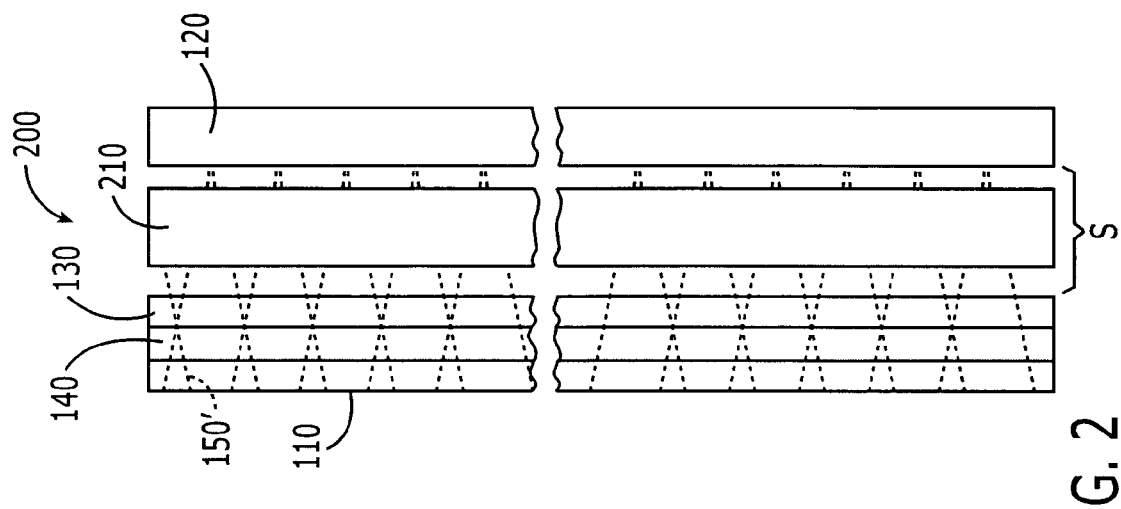
FIGS. 2-4 are cross-sectional views of display panels for flat panel displays according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a flat panel display. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
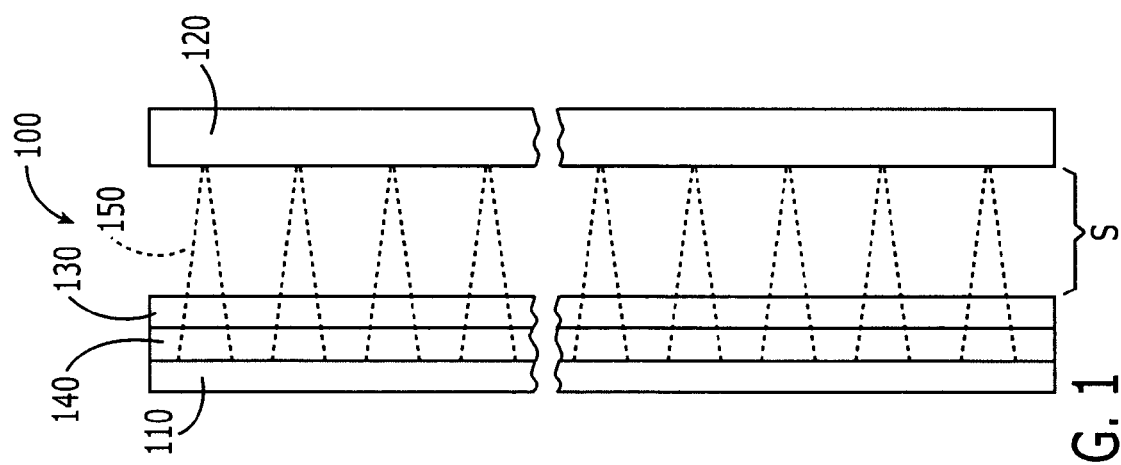
FIG. 1 is a cross-sectional view of a display panel for a flat panel display that may exhibit backlighting nonuniformity.

FIG. 1 is a cross-sectional view of display panels for flat panel displays that may exhibit backlighting nonuniformity. As shown in FIG. 1, these display panels 100 include a planar array 110 of LCD devices, also referred to herein as an "LCD screen" or an "LCD device screen" 110. As is well known to those having skill in the art, an LCD screen 110 may include a liquid crystal substance between pieces of glass or other material, and may also include polarizing films and one or more electrode layers. The design of an array 110 of LCD devices is well known to those having skill in the art, and need not be described further herein.

Still referring to FIG. 1, a diffusion panel 130 also is provided on the LCD device screen 110. The diffusion panel 130 generally comprises an acrylic scattering film which may be about 2 mm thick. One or more brightness-enhancing film(s) (BEF) 140 may be provided between the LCD device screen 110 and the diffusion panel 130. The design of diffusion panels 130 and brightness-enhancing films 140 are well known to those having skill in the art, and need not be described further herein. Moreover, the array of LCD devices 110, the diffusion panel 130, and the brightness-enhancing film(s) 140 may be placed directly on one another, as shown in FIG. 1, and/or may be spaced apart from one another using intervening films and/or air gaps.

Still referring to FIG. 1, a light source 120 is provided that is spaced apart from the diffusion panel to define a light path 150 from the light source 120 to the diffusion panel 130, and thereby provide backlighting on the LCD device screen 110. The light source 120 may include a planar array of LED devices, as was described in any of the embodiments of the above-cited application Ser. No. 11/022,332, may include other conventional arrays of LED devices, may include an array of fluorescent cold cathode tubes and/or other suitable light sources that can provide direct backlighting of the LCD device screen 110. One or more LED devices and/or fluorescent cold cathode tubes may also be configured to provide edge backlighting.

As shown in FIG. 1, the light paths 150 may be non-overlapping and/or may overlap such that a predetermined spatial nonuniformity of backlighting is provided on the LCD device screen 110. For example, it may be desirable to provide a spacing S of about 17 mm between the light source 120 and the diffusion panel 130, to define a mixing zone. When the light source 120 uses an array of LEDs, for example one or more red, green and/or blue LEDs, to provide the appearance of white light, a spatial nonuniformity of light intensity across the LCD screen 110 may appear, so that the backlighting is not uniform. As used herein, "uniform" backlighting means that an ordinary viewer, who views the display at a conventional viewing distance, is not aware of variation in backlighting intensity. In some embodiments, variations of less than about 25% may provide uniform intensity, whereas, in other embodiments, variations of less than 5% may provide uniform intensity.

It has been estimated that, at a 26 mm LED pitch, the spacing S may need to be increased to about 25 mm to provide uniform backlighting. However, this increase in spacing S may be undesirable. It is also possible to reduce the pitch between adjacent LED devices in the array. However, reduced LED pitch may undesirably increase the cost and/or power consumption of the flat panel display.

FIG. 2 is a cross-sectional view of display panels for flat panel displays according to various embodiments of the present invention. As shown in FIG. 2, these display panels 200 include optical means 210 in the light path 150' from the light source 120 to the diffusion panel 130, for reducing the spatial nonuniformity of the backlighting on planar array of LCD devices 110. It has been found, according to some embodiments of the present invention, that by adding optical means 210 in the light path 150' for reducing the spatial nonuniformity of the backlighting on the planar array of LCD devices 110, more uniform backlighting may be achieved while maintaining the spacing S the same, for example at 17 mm.

In some embodiments, the optical means for reducing the spatial nonuniformity 210 may comprise material in the light path 150' that is configured to refract, reflect and/or scatter light in the light path 150'. In some embodiments, the optical means for reducing spatial nonuniformity 210 comprises a solid foam structure as will be described in detail in FIG. 3. In other embodiments, the optical means for reducing spatial nonuniformity 210 comprises a solid colloidal dispersion of particles of a first material having a first index of refraction in a second material having a second index of refraction, as will be described in detail in FIG. 4. The index of refraction of the first material may be higher than or lower than the index of refraction of the second material. In some embodiments, the solid foam structure comprises an aerogel. It will be understood by those having skill in the art that the optical means for reducing the spatial uniformity 210 is shown in FIG. 2 as being spaced apart from both the light source 120 and the diffusion panel 130. However, in other embodiments, the optical means for reducing spatial nonuniformity 210 may be directly on the light source 120 and/or directly on the diffusion panel 130.

Figure 3:
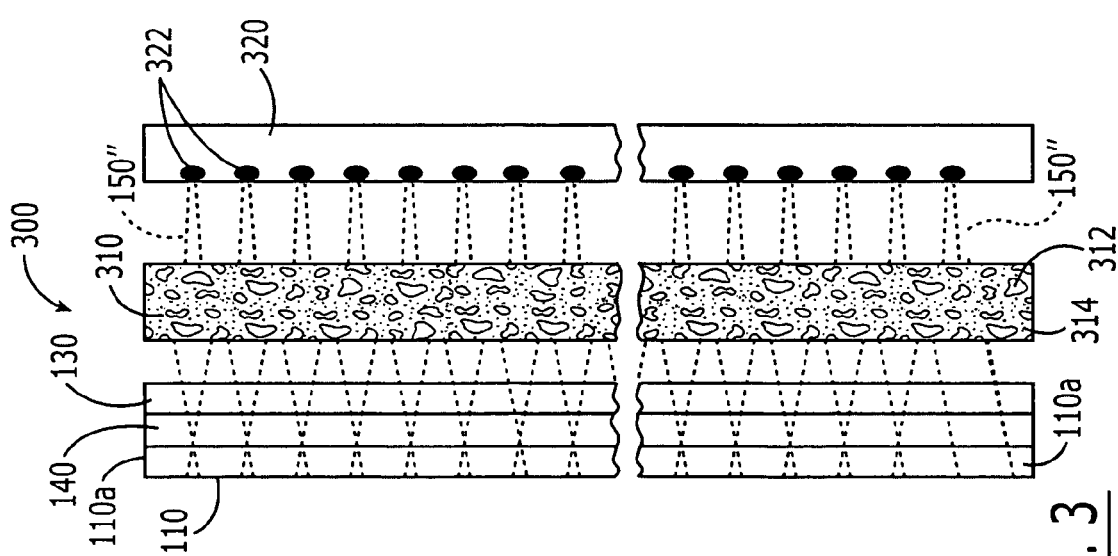

FIG. 3 is a cross-sectional view of display panels for flat panel displays according to other embodiments of the present invention. As shown in FIG. 3, these display panels 300 include a planar array 320 of LED devices 322 that are configured to radiate light in a light path 150" that impinges on the planar array of LCD devices 110, to provide backlighting on the planar array of LCD devices 110. As shown in FIG. 3, the plurality of LED devices 322 may comprise a planar array of LED devices 322 that is closely spaced apart from the planar array of LCD devices 110, to define the light path 150", wherein at least some of the LED devices 322 are disposed within a periphery 110a of the planar array of LCD devices 110. The planar array of LED devices 322 may be provided according to any of the embodiments described in application Ser. No. 11/022,332 and/or using other configurations.

Still referring to FIG. 3, a solid foam structure 310 is provided in the light path. In some embodiments of the present invention, the solid foam structure 310 comprises an open cell foam block. As is well known to those having skill in the art, closed cell foam includes discretely spaced apart bubbles therein, whereas open cell foam includes connected bubbles that form interconnected passageways. In other embodiments, however, closed cell foam also may be used.

In some embodiments, the solid foam structure 310 includes widely available open cell polyethylene foam, available, for example, from Sealed Air Corporation, Polyethylene Foam Division, Saddle Brook, N.J., and from other sources. Although this polyethylene foam appears as white in color due to refraction, it may be transparent to light in the light path. As used herein, the term "transparent" means that at least some of the incident light passes through the material to emerge therefrom. In some embodiments, about 20% or less of the incident light is absorbed by the open cell polyethylene foam. It also will be understood that the air bubbles 312 in the foam structure 310 may be of uniform and/or nonuniform size, shape and/or distribution in the optically transparent plastic material 314. Moreover, the solid foam structure 310 may comprise compressible and/or incompressible foam. In still other embodiments of the present invention, the solid foam structure 310 comprises an aerogel, available, for example, from Cabot Corporation, Billerica, Mass., and from many other sources. The aerogel may be engineered to contain phosphor and/or other optical materials therein if desirable. For example, blue LEDs 322 may be used in connection with red, green and/or other phosphors in the aerogel, to provide the appearance of white light.

Finally, in some embodiments, the solid foam structure 310 may also be a thermally insulating material that provides a thermal barrier between the light source 320 and the LCD screen 110. As is well known to those having skill in the art, LCDs may be very temperature sensitive, and the thermal barrier that is provided by the solid foam structure 310 may desirably reduce the temperature of the LCD screen.

Figure 4:
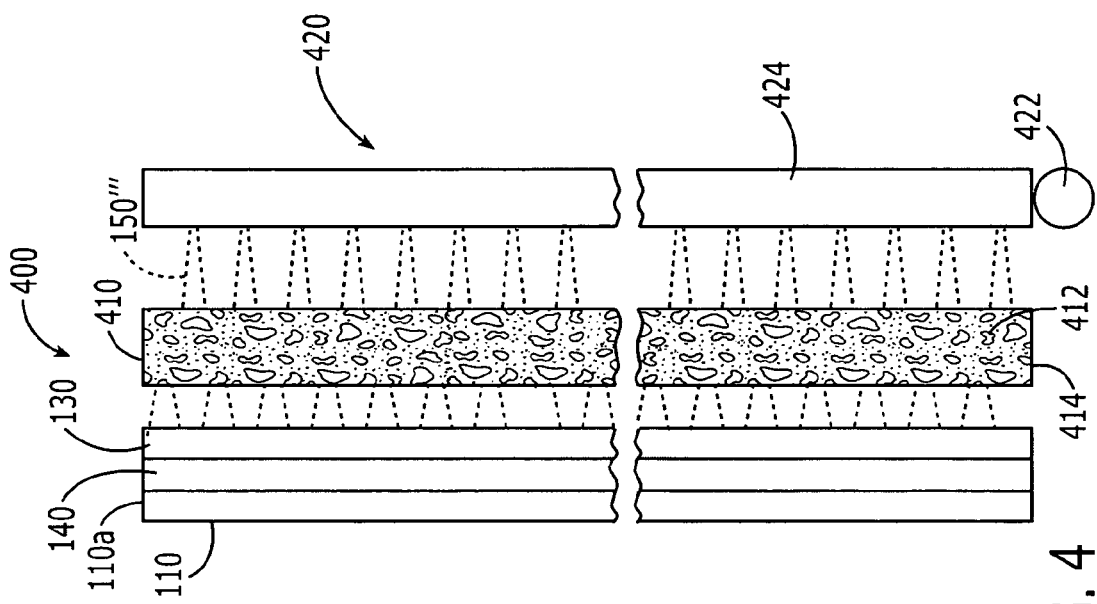

FIG. 4 is a cross-sectional view of display panels for flat panel displays according to still other embodiments of the present invention. As shown in FIG. 4, these display panels 400 include a light source 420 that includes an edge illumination source 422 (including at least one LED device and/or at least one fluorescent cold cathode tube) and a light pipe or light guide 424, to guide the light from the edge illuminating source 422. The design of light pipes 424 are well known to those having skill in the art, and need not be described further herein.

In FIG. 4, a solid colloidal dispersion 410 of particles 412 of a first material having a first index of refraction dispersed in a second material 414 having a second index of refraction is provided. The solid colloidal dispersion 410 is located in the light path 150''' and is configured to reduce spatial nonuniformity of the backlighting on the planar array of LCD devices 110, compared to backlighting provided without the solid colloidal dispersion 410 in the light path 510'''. It will be understood by those having skill in the art that solid foam structures 310 of FIG. 3 can also provide embodiments of solid colloidal dispersions 410 of FIG. 4, wherein the first material comprises a gas. The solid colloidal dispersion 410 is configured to reflect, refract and/or scatter light in the light path.

In some embodiments, the first and second materials 412 and 414 are optically transparent, but have different indices of refraction. For example, in some embodiments, the particles 412 of first material may be air and the second material 414 may be polyethylene and/or silicon dioxide. In other embodiments, the particles 412 of the first material may be titanium oxide particles, and the second material 414 may be polyethylene and/or silicon dioxide. Other materials and combinations also may be used. It will also be understood that the index of refraction of the particles 412 of the first material may be greater than or less than the index of refraction of the second material 414.

It will be understood by those having skill in the art that various combinations and subcombinations of embodiments of FIGS. 1-4 may be provided according to other embodiments of the present invention. Thus, for example, any of the optical elements 210, 310 or 410 may be used with any configuration of the light sources 120, 320 and/or 420. Moreover, in some embodiments, a diffusion panel 130 and/or brightness-enhancing film(s) 140 need not be present. Finally, it will be understood that the spacings illustrated in FIGS. 1-4 are merely illustrative. Thus, for example, when providing optical elements 210, 310 and/or 410 according to various embodiments of the present invention, the spacing S between the light source 120, 320 and or 420, and the array of LCD devices 110 may be reduced compared to FIG. 1. Moreover, as was already stated, the various elements shown in FIGS. 2-4 may be spaced apart from and/or directly on one another.

Additional discussion of various embodiments of the present invention now will be provided. In particular, according to some embodiments, high transparency diffusing, scattering and light transporting material may be provided to improve the spatial uniformity of light for backlight applications. In some embodiments, by inserting a layer of open cell foam, a desired uniformity may be achieved at a desired thickness. The foam may be considered an ordered and/or random array of index changing material. The transparent plastic may have an index of refraction of about 1.5, and the air may have an index of refraction of 1.0. At each index change, the light is, at a minimum, refracted. Additionally, there may a reflection component. There may also be some diffusing of the light. Other engineered materials may be used with two different indices of refraction having a desired geometry. For example, it is known to use "photonic crystal" engineered materials to improve light extraction from LEDs themselves. Moreover, materials such as aerogel or xerogel (an aerogel with microscopic-sized bubbles of first materials dispersed in a second material) may be used.

Embodiments of the present invention may be used to reduce the size of, and/or improve the efficacy of, the mixing zone that is conventionally provided in backlit LCD displays.

Embodiments of the present invention may also be regarded as providing an assembly for direct LED backlighting of LCD screens that includes a printed circuit board (PCB) on which a plurality of LEDs are mounted in an array having a predetermined pitch, a thin acrylic scattering plate and a layer of diffuser material between the PCB and the acrylic scattering plate. The diffuser can improve the spatial uniformity of light from the array, and may comprise a material having a refractive index and including localized regions of a material having a different refractive index dispersed throughout in an ordered and/or random fashion. The diffuser may be a uniform structure, and/or may comprise an open cell foam of a transparent plastic embedded with air bubbles. The spacing of the LED clusters (pitch) may be set at 25 mm, which may lead to spatially nonuniform light intensity at the LCD when a thickness of 17 mm between the LEDs and the acrylic scattering plate is used. The diffuser layer can reduce or eliminate this nonuniformity without having to increase the distance between the LED array and the scattering plate, by improving the scattering, diffusing and/or light transport between the two. The diffuser layer may be an array of index changing material and air bubbles similar to foam. Additional uniform or nonuniform structured materials also may be used, as was described above.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A display panel for a flat panel display comprising:
   a planar array of liquid crystal display (LCD) devices;
   a plurality of light emitting diode (LED) devices that are configured to radiate light in a light path that impinges on the planar array of LCD devices to provide backlighting on the planar array of LCD devices; and
   a solid foam structure in the light path.

2. A display panel according to claim 1 wherein the plurality of LED devices comprises a planar array of LED devices that is closely spaced apart from the planar array of LCD devices to define the light path, at least some of the LED devices being disposed within a periphery of the planar array of LCD devices.

3. A display panel according to claim 1 wherein the solid foam structure comprises an open cell foam block.

4. A display panel according to claim 1 wherein the solid foam structure comprises a solid colloidal dispersion of air bubbles in an optically transparent material having an index of refraction that is different from air.

5. A display panel according to claim 1 wherein the solid foam structure comprises compressible and/or incompressible foam.

6. A display panel according to claim 1 wherein the solid foam structure comprises an aerogel.

7. A display panel according to claim 1 wherein the aerogel includes phosphor therein.

8. A display panel according to claim 1 wherein the solid foam structure is thermally insulating.

9. A display panel according to claim 1 wherein the plurality of LED devices comprises a planar array of LED devices that are disposed within the periphery of the planar array of LCD devices and that are configured to radiate light in a light path that impinges on the planar array of LCD devices to provide backlighting on the planar array of LCD devices; and
wherein a distance of less than 20 mm is provided between the planar array of LED devices and the planar array of LCD devices.

10. A display panel according to claim 9, further comprising a diffuser between the planar array of LCD devices and the planer array of LED devices.

11. A display panel according to claim 9 wherein a distance of less than about 17 mm is provided between the planar array of LED devices and the planar array of LCD devices.

12. A display panel according to claim 11 wherein the planar array of LED devices are arranged at a pitch of less than about 25 mm therebetween.

13. A display panel according to claim 12 wherein the planar array of LED devices are configured to provide uniform backlighting on the planar array of LCD devices.

14. A display panel according to claim 13 further comprising a diffuser material between the planar array of LCD devices and the planar array of LED devices.

15. A display panel for a flat panel display comprising:
a planar array of liquid crystal display (LCD) devices;
a light source that is configured to radiate light in a light path that impinges on the planar array of LCD devices to provide backlighting on the planar array of LCD devices; and
a solid colloidal dispersion of particles of a first material having a first index of refraction dispersed in a second material having a second index of refraction, the solid colloidal dispersion being located in the light path and being configured to reduce spatial nonuniformity of the backlighting on the planar array of LCD devices compared to spatial uniformity of the backlighting in the absence of the solid colloidal dispersion in the light path.

16. A display panel according to claim 15 wherein the light source comprises at least one light emitting diode (LED) device and/or at least one fluorescent cold cathode tube.

17. A display panel according to claim 16 wherein the at least one LED device comprises a planar array of LED devices that is closely spaced apart from the planar array of LCD devices to define the light path, at least some of the LED devices being disposed within a periphery of the planar array of LCD devices.

18. A display panel according to claim 15 wherein the first material comprises a solid and/or a gas.

19. A display panel according to claim 15 wherein the solid colloidal dispersion is configured to reflect, refract and/or scatter light in the light path.

20. A display panel according to claim 15 wherein the first and second materials are optically transparent.

21. A display panel for a flat panel display comprising:
a liquid crystal display (LCD) device screen;
a diffusion panel on the LCD device screen;
a light source that is spaced apart from the diffusion panel to define a light path from the light source to the diffusion panel and provide backlighting on the LCD device screen of a predetermined spatial nonuniformity; and
optical means in the light path from the light source to the diffusion panel for reducing the spatial nonuniformity of the backlighting on the planar array of LCD devices;
wherein the optical means for reducing spatial nonuniformity comprises a solid foam structure in the light path.

22. A display panel according to claim 21 further comprising:
a brightness enhancing film between the LCD device screen and the diffusion panel.

23. A display panel according to claim 21 wherein the diffusion panel comprises an acrylic scattering film.

24. A display panel according to claim 21 wherein the light source comprises at least one light emitting diode (LED) device and/or at least one fluorescent cold cathode tube.

25. A display panel according to claim 21 wherein the solid foam structure comprises an aerogel.

26. A display panel according to claim 25 wherein the aerogel includes phosphor therein.

27. A display panel according to claim 21 wherein the solid foam structure is thermally insulating.

28. A display panel for a flat panel display comprising:
a liquid crystal display (LCD) device screen;
a diffusion panel on the LCD device screen;
a light source that is spaced apart from the diffusion panel to define a light path from the light source to the diffusion panel and provide backlighting on the LCD device screen of a predetermined spatial nonuniformity; and
optical means in the light path from the light source to the diffusion panel for reducing the spatial nonuniformity of the backlighting on the planar array of LCD devices;
wherein the optical means for reducing spatial non uniformity comprises a solid colloidal dispersion of particles of a first material having a first index of refraction in a second material having a second index of refraction.

* * * * *